(12) United States Patent
Senarath et al.

(10) Patent No.: US 10,887,118 B2
(45) Date of Patent: **\*Jan. 5, 2021**

(54) METHODS AND SYSTEMS FOR PROVISIONING A VIRTUAL NETWORK IN SOFTWARE DEFINED NETWORKS

(71) Applicants: Nimal Gamini Senarath, Ottawa (CA); Ngoc-Dung Dao, Ottawa (CA); Philippe Leroux, Ottawa (CA); Meisam Mirahsan, Gatineau (CA)

(72) Inventors: Nimal Gamini Senarath, Ottawa (CA); Ngoc-Dung Dao, Ottawa (CA); Philippe Leroux, Ottawa (CA); Meisam Mirahsan, Gatineau (CA)

(73) Assignee: Huawei Technologies Co., Ltd., Shenzhen (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 16/023,716

(22) Filed: Jun. 29, 2018

(65) Prior Publication Data

US 2018/0317230 A1 Nov. 1, 2018

Related U.S. Application Data

(63) Continuation of application No. 14/877,307, filed on Oct. 7, 2015, now Pat. No. 10,039,112.

(Continued)

(51) Int. Cl.
*H04L 12/14* (2006.01)
*H04W 4/021* (2018.01)
(Continued)

(52) U.S. Cl.
CPC ............ *H04L 12/14* (2013.01); *H04M 15/80* (2013.01); *H04M 15/8016* (2013.01);
(Continued)

(58) Field of Classification Search
None
See application file for complete search history.

(56) References Cited

U.S. PATENT DOCUMENTS 5,982,748 A 11/1999 Yin et al.
6,272,131 B1 8/2001 Ofek
(Continued)

FOREIGN PATENT DOCUMENTS

CA 2874463 C 5/2019
CN 101166181 A 4/2008
(Continued)

OTHER PUBLICATIONS

PCT International Search Report and Written Opinion, PCT/CN2015/091667, dated Dec. 29, 2015, 11 pages.
(Continued)

*Primary Examiner* — Mohammad S Adhami

(57) ABSTRACT

Upon receiving a request for a virtual network and before admitting the requested virtual network, a virtual service provider controller may assess the ability of the virtual service provider network to meet conditions specified in the request. In particular, the virtual service provider controller may consider details of the traffic expected in the requested virtual network in the context of existing traffic on the virtual service provider network. Consideration may be given to geographic distribution of traffic, type of traffic, and key performance indices. Indeed, traffic of different types may be homogenized through the use of weighting factors to simplify the assessment. Upon determining that the virtual service provider network may not be able to meet the conditions, the virtual service provider controller may attempt to obtain additional resources from an infra-structure provider network or may attempt to adjust resources allocated to already admitted virtual networks.

28 Claims, 7 Drawing Sheets

Related U.S. Application Data

(60) Provisional application No. 62/062,814, filed on Oct. 10, 2014, provisional application No. 62/063,922, filed on Oct. 14, 2014.

(51) Int. Cl.
| | |
|---|---|
| *H04W 24/10* | (2009.01) |
| *H04M 15/00* | (2006.01) |
| *H04W 72/04* | (2009.01) |
| *H04W 12/08* | (2009.01) |

(52) U.S. Cl.
CPC ... *H04M 15/8022* (2013.01); *H04M 15/8027* (2013.01); *H04M 15/8033* (2013.01); *H04M 15/8083* (2013.01); *H04W 4/021* (2013.01); *H04W 24/10* (2013.01); *H04W 72/0486* (2013.01); *H04W 12/08* (2013.01); *H04W 72/0406* (2013.01)

(56) References Cited

U.S. PATENT DOCUMENTS

| | | | |
|---|---|---|---|
| 6,842,783 B1 | 1/2005 | Boivie et al. | |
| 7,925,756 B1 | 4/2011 | Riddle | |
| 9,329,937 B1 | 5/2016 | Grant et al. | |
| 9,392,471 B1 | 7/2016 | Thomas et al. | |
| 10,039,112 B2* | 7/2018 | Senarath | H04M 15/8083 |
| 10,129,894 B2 | 11/2018 | Farmanbar et al. | |
| 2003/0033461 A1 | 2/2003 | Malik et al. | |
| 2003/0103510 A1 | 6/2003 | Svanberg et al. | |
| 2004/0032847 A1 | 2/2004 | Cain | |
| 2004/0146036 A1 | 7/2004 | Parantainen et al. | |
| 2004/0203973 A1 | 10/2004 | Khan | |
| 2006/0085544 A1 | 4/2006 | Chen et al. | |
| 2007/0297367 A1 | 12/2007 | Wang et al. | |
| 2008/0129464 A1 | 6/2008 | Frey et al. | |
| 2008/0130519 A1 | 6/2008 | Bahl et al. | |
| 2009/0191888 A1 | 7/2009 | Abedi | |
| 2010/0069081 A1 | 3/2010 | Mitra et al. | |
| 2010/0122141 A1 | 5/2010 | Arye | |
| 2010/0216404 A1 | 8/2010 | Hershey et al. | |
| 2010/0242092 A1 | 9/2010 | Harris et al. | |
| 2011/0125905 A1 | 5/2011 | Baucke et al. | |
| 2011/0246647 A1 | 10/2011 | Marquezan et al. | |
| 2012/0051296 A1 | 3/2012 | Kokku et al. | |
| 2012/0233302 A1 | 9/2012 | Kallin et al. | |
| 2013/0007232 A1 | 1/2013 | Wang et al. | |
| 2013/0143574 A1 | 6/2013 | Teyeb et al. | |
| 2013/0182601 A1 | 7/2013 | Bandyopadhyay et al. | |
| 2013/0183991 A1 | 7/2013 | Bosch et al. | |
| 2013/0201847 A1 | 8/2013 | Chincholi et al. | |
| 2013/0212285 A1* | 8/2013 | Hoffmann | H04L 41/0893 709/226 |
| 2013/0225123 A1 | 8/2013 | Adjakple et al. | |
| 2013/0250770 A1 | 9/2013 | Zou et al. | |
| 2013/0295946 A1 | 11/2013 | Panchal et al. | |
| 2014/0052877 A1 | 2/2014 | Mao | |
| 2014/0067800 A1 | 3/2014 | Sharma | |
| 2014/0086177 A1 | 3/2014 | Adjakple et al. | |
| 2014/0086194 A1 | 3/2014 | Sugahara et al. | |
| 2014/0119218 A1 | 5/2014 | Hsu | |
| 2014/0200036 A1* | 7/2014 | Egner | H04W 64/00 455/456.3 |
| 2014/0244808 A1 | 8/2014 | Axelrod et al. | |
| 2014/0269295 A1 | 9/2014 | Anumala et al. | |
| 2014/0282769 A1 | 9/2014 | Salem et al. | |
| 2014/0282944 A1 | 9/2014 | Li | |
| 2014/0301192 A1 | 10/2014 | Lee et al. | |
| 2015/0011234 A1 | 1/2015 | Wei et al. | |
| 2015/0043382 A1 | 2/2015 | Arora et al. | |
| 2015/0063112 A1 | 3/2015 | Wu et al. | |
| 2015/0100694 A1 | 4/2015 | Sohail | |
| 2015/0104172 A1 | 4/2015 | Wang et al. | |
| 2015/0109995 A1 | 4/2015 | Mathai et al. | |
| 2015/0154258 A1 | 6/2015 | Xiong et al. | |
| 2015/0236948 A1 | 8/2015 | Dunbar et al. | |
| 2015/0334696 A1 | 11/2015 | Gu et al. | |
| 2015/0351118 A1 | 12/2015 | Arnott et al. | |
| 2016/0044702 A1 | 2/2016 | Centonza et al. | |
| 2016/0072691 A1 | 3/2016 | Xu et al. | |
| 2016/0337442 A1 | 11/2016 | Idicula et al. | |
| 2016/0352528 A1 | 12/2016 | Law et al. | |
| 2016/0353422 A1 | 12/2016 | Vrzic et al. | |
| 2017/0064031 A1 | 3/2017 | Sunay | |
| 2017/0079059 A1 | 3/2017 | Li et al. | |
| 2017/0093748 A1 | 3/2017 | Kallin et al. | |
| 2017/0104609 A1 | 4/2017 | McNamee et al. | |
| 2017/0126492 A1 | 5/2017 | Law et al. | |
| 2017/0127427 A1 | 5/2017 | Claridge et al. | |
| 2017/0208019 A1 | 7/2017 | Shimojou et al. | |
| 2017/0257870 A1 | 9/2017 | Farmanbar et al. | |
| 2017/0311304 A1 | 10/2017 | Lu | |
| 2017/0346752 A1 | 11/2017 | Krishnamurthy et al. | |

FOREIGN PATENT DOCUMENTS

| | | |
|---|---|---|
| CN | 102427473 A | 4/2012 |
| CN | 102710508 A | 10/2012 |
| CN | 103052054 A | 4/2013 |
| CN | 103168445 A | 6/2013 |
| CN | 103369535 A | 10/2013 |
| CN | 103548370 A | 1/2014 |
| CN | 103703724 A | 4/2014 |
| CN | 104243301 A | 12/2014 |
| CN | 104252390 A | 12/2014 |
| CN | 104335639 A | 2/2015 |
| EP | 1729532 A1 | 12/2006 |
| EP | 2493235 A1 | 8/2012 |
| EP | 2627140 A1 | 8/2013 |
| EP | 2667541 A1 | 11/2013 |
| EP | 2866495 A2 | 4/2015 |
| GB | 2512900 A | 10/2014 |
| JP | 2009542091 A | 11/2009 |
| JP | 2011508474 A | 3/2011 |
| JP | 2013541289 A | 11/2013 |
| JP | 2014045390 A | 3/2014 |
| JP | 2014090501 A | 5/2014 |
| JP | 2015080204 A | 4/2015 |
| KR | 20130084680 A | 7/2013 |
| WO | 2009071431 A1 | 6/2009 |
| WO | 2011032595 A1 | 3/2011 |
| WO | 2012055448 A1 | 5/2012 |
| WO | 2013170045 A2 | 11/2013 |
| WO | 2014086978 A1 | 6/2014 |
| WO | 2014090997 A1 | 6/2014 |
| WO | 2014117135 A2 | 7/2014 |
| WO | 2014160228 A1 | 10/2014 |
| WO | 2014197778 A1 | 12/2014 |
| WO | 2015031512 A1 | 3/2015 |
| WO | 2015057960 A1 | 4/2015 |

OTHER PUBLICATIONS

3GPP TR 22.891 V0.1.0 (Apr. 2015), 3rd Generation Partnership Project; Technical Specification Group Services and System Aspects; Feasibility Study on New Services and Markets Technology Enablers; Stage 1(Release 14), total 26 pages.

Hamid Farmanbar et al., "Traffic Engineering for Software-Defined Radio Access Networks", 2014 IEEE Network Operations and Management Symposium, May 5, 2014, total 8 pages.

Chengchao Liang et al., "Wireless Virtualization for Next Generation Mobile Cellular Network", IEEE Wireless Communication, Feb. 2015, total 10 pages.

Chengchao Liang et al., "Wireless Network Virtualization: A Survey, Some Research Issues and Challenges", IEEE Communication Surveys and Rutorials, vol. 17, No. 1, First Quarter 2015, total 24 pages.

Takuya Shimojyo, et al., "Future Mobile Core Network for Efficient Service Operation", Network Softwarization, 1st 2015 IEEE Conference on, Apr. 2015, total 6 pages.

(56) References Cited

OTHER PUBLICATIONS

Tsuyoshi Ogura et al., "A Study on Congestion Avoidance Technology using Multiple Virtual Networks", IEICE technical report, vol. 114 No. 28, May 8, 2014,total 8 pages.
ETSI GS NFV 002 V1.2.1 (Dec. 2014),Network Functions Virtualisation (NFV);Architectural Framework,total 21 pages.
Akihiro Nakao, "Virtualization Technology for Building New-Generation Networks", Virtual Node Project,NICT News,Jun. 30, 2010,total 12 pages.

* cited by examiner

METHODS AND SYSTEMS FOR PROVISIONING A VIRTUAL NETWORK IN SOFTWARE DEFINED NETWORKS

CROSS-REFERENCE TO RELATED APPLICATIONS

The present application is a continuation of U.S. patent application Ser. No. 14/877,307, filed Oct. 7, 2015, which claims priority to U.S. Patent Provisional Application No. 62/062,814, filed Oct. 10, 2014, and to U.S. Patent Provisional Application No. 62/063,922, filed Oct. 14, 2014. The contents of all applications are hereby incorporated herein by reference.

FIELD

The present application relates generally to software defined networks and, more specifically, to methods and systems for provisioning a virtual network in software defined networks.

BACKGROUND

Software-defined networking (SDN) allows network administrators to manage network services through abstraction of lower level functionality. This is done by decoupling the system that makes decisions about where traffic is sent (the control plane) from the underlying systems that forward traffic to the selected destination (the data plane).

There can be multiple types of virtual networks provided by a single service provider. One type of virtual network is a single customer single session service. Another type of virtual network is a bundle of services belonging to a group of users, such as a virtual network operated by a virtual network operator.

SUMMARY

In the latter case, a virtual service provider controller may be tasked with providing a virtual network with a certain level of Quality of Experience (QoE) and/or Quality of Service (QoS) for each session that employs the virtual network. The virtual service provider controller may be also tasked with maintaining network key performance indices agreed with the virtual network operator.

Upon receiving a request for a virtual network and before admitting the requested virtual network, a virtual service provider controller may assess the ability of the virtual service provider network to meet conditions specified in the request. In particular, the virtual service provider controller may consider details of the traffic expected in the requested virtual network in the context of existing traffic on the virtual service provider network.

According to an aspect of the present disclosure, there is provided a method of admitting a virtual network including receiving, from a virtual network operator, a request for admission of a virtual network, the request including a specification of at least one resource required by the virtual network, transmitting a request for resources, determined in accordance with the received request for admission, to an infrastructure provider network controller and in accordance with a reply received in response to the request for resources, transmitting an admission decision to the virtual network operator. In another aspect of the present application, a virtual service provider controller is provided for carrying out this method.

According to an aspect of the present disclosure, there is provided a method of admitting a virtual network. The method includes receiving, from a virtual network operator, a request for admission of a virtual network, the request including an indication of geographic and temporal distribution of traffic, as defined for a plurality of regions and a plurality of time periods, determining that the traffic does not exceed predetermined capacity boundaries and responsive to the determining, admitting the virtual network. In another aspect of the present application, a virtual service provider controller is provided for carrying out this method.

According to an aspect of the present disclosure, there is provided a method of requesting admission of a virtual network, the method includes transmitting, to a service provider, a request for admission of a virtual network, the request including a temporal distribution of traffic across a series of geographic regions forming a subset of the geographic coverage of the service provider. In another aspect of the present application, a virtual network operator is provided for carrying out this method.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

Figure 1:
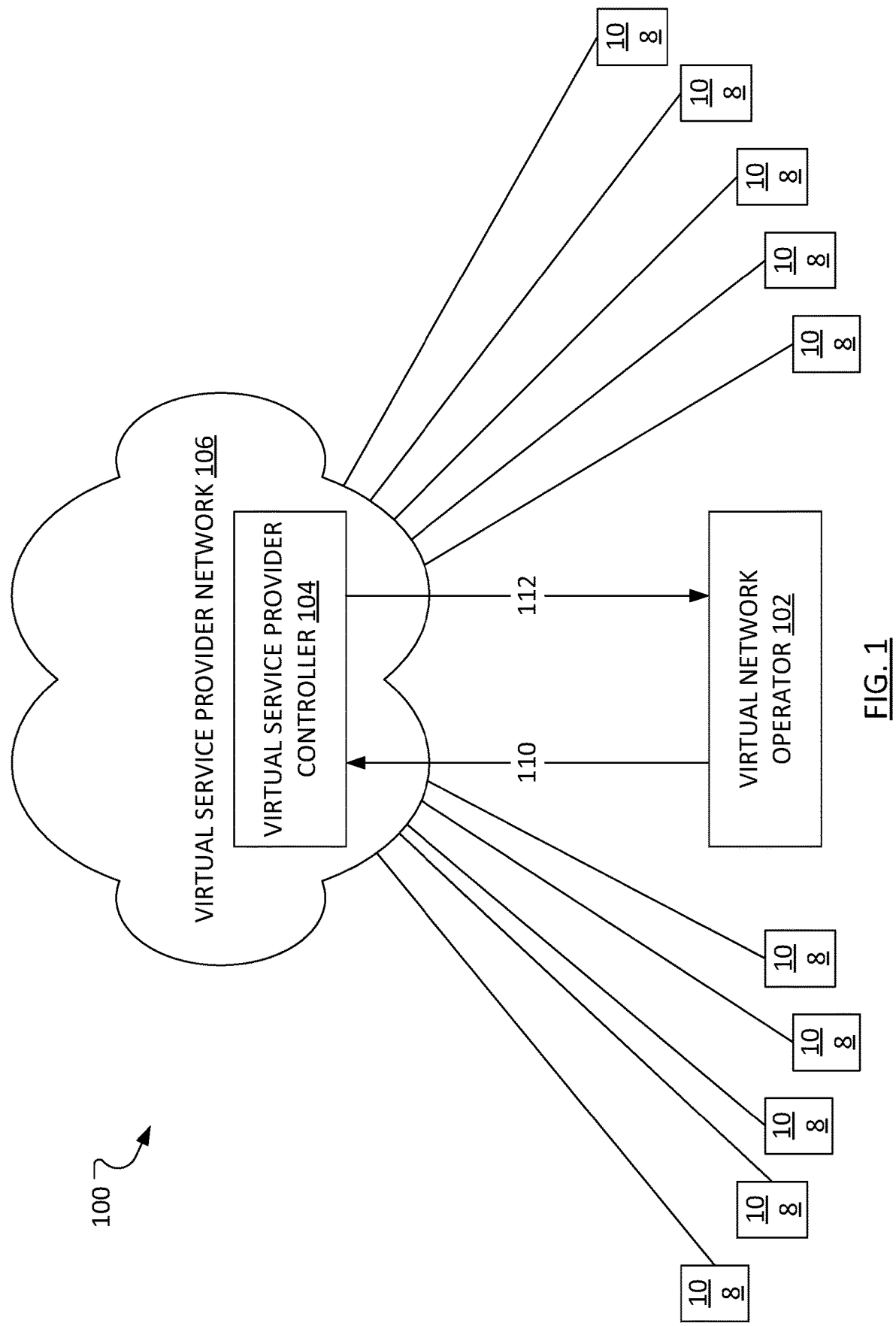
FIG. 1 illustrates an environment for aspects of the present application.

In existing 3G and 4G networks, network operators typically own infrastructure, including access link as well as core network resources. These resources are used to provide service directly to end customers. In addition to this, some mobile network operators (MNOs) provide varying degrees of service to Mobile Virtual Network Operators (MVNOs). An MVNO typically doesn't own access link infrastructure, and may not own their own core network resources. In next generation networks, such as so-called fifth generation (5G) networks, it is envisioned that there will be a change in how network services are provided. An Infrastructure Provider (InP) will be an entity that owns infrastructure, while a Telecommunications Connectivity Service Provider (TCSP), also referred to as a Virtual Service Provider, will be an entity that provides telecommunications services atop the InP resources. A Virtual Network Operator, VNO obtains services from a TCSP, and can then provide them to a customer base. It should be noted that the equivalent to a carrier in the 3G/3G networking context can cross many of the different roles.

Such a network model allows for a greater variety of participants in the wireless network ecosystem, including small players that provide a single service, or entities that own infrastructure (including any of wireless access equipment, point to point connections or other such resources), and Virtual Network (VN) operators that much like MVNOs in 3G/4G networks, do not need to own any resources.

With such a network architecture, it is possible for various groups or organizations, such as public safety organizations, corporations and other such entities to establish their own virtual networks. Such organizations are likely to have predetermined service requirements and, as such, may negotiate with one or more TCSPs to obtain access to connectivity services so that the desired virtual network can be implemented. The predetermined service requirements of the organizations may be expressed as one or more key performance indices. The VN does not need to engage the InP, and can rely upon the TCSP to provide the services that it requires.

A TCSP can make use of the infrastructure of a number of different InPs. This allocation of resources allows the TCSP to generate a pool of resources that can be drawn upon to serve the needs and requirements of the VNOs. It may be in the financial interest of a TCSP to maximize resource usage, while still guaranteeing the services that they commit to VNOs. From the perspective of the TCSP, a request for an admission of a virtual network from an organization should be granted if the service requirements of the VN can be guaranteed. Because a TCSP is responsible for providing the services that it has committed to, and because there may be penalties associated with failure to provide service to the admitted VN, the TCSP may perform an assessment regarding whether a new virtual network may be admitted. Such an assessment can consider whether the resources currently available to the TCSP are sufficient to meet the service requirements of the new virtual network. The assessment is also expected to consider the degree to which admitting the new virtual network will impact the ability of the service provider to continue to meet the service requirements of one or more already-admitted virtual networks.

In one aspect of the present application, the environment in which other aspects of the present application are to operate may be divided into geographic regions, each region having similar signal combinations from multiple neighbor access points. The virtual network operator provides, in a request for a virtual network, an estimated geographical and temporal distribution of traffic for the regions and for specific traffic types. Since the network resource usage also depends on the traffic type, a separate distribution for each traffic type of a plurality of traffic types may be included.

Notably, the geographic and temporal distribution of traffic may include such factors as user population, percentage of active users in a given geographical area, service types, peak rates, service outage rates, blocking rates, service quality (set up time, etc.) and coverage.

As may be well understood, in the realm of software defined networking, there may be multiple types of virtual network services provided by a given service provider. These types include a "single session single customer" type of virtual network service and a "multiple session multiple customer" type of virtual network service. Admitting a virtual network of the "single session single customer" type of virtual network service may be considered a specific case of virtual network embedding and the service requirements may be defined in terms of a "Quality of Experience" (QoE).

For the "multiple session multiple customer" type of virtual network service, there is expected to be group of customers with a defined mobility pattern and a defined traffic distribution. When negotiating service requirements for this type of virtual network service, there are several options.

In a first option, the service provider may provide a predetermined proportion of network resources to serve the virtual network requirements. This may be expressed as a percentage of the current resources of the TCSP. The service provider may allocate these network resources with or without exclusive access to the allocated network resources. This choice between exclusive and non-exclusive access is often associated with the terms hard slicing or soft slicing of the network resources.

In a second option, the service provider may provide a specific topology. That is, the service provider may provide the virtual network with a list of access points that the VN can use. Each access point may be associated with specific capacities, specific resources and pipes with specific capacities connecting the access points. The VN can select a subset of the access points to define its own topology. Notably, resource allocation is more suitable for access points, because capacity depends on user location.

In a third option, the service provider may agree to a service level agreement for providing a virtual network that conforms to predetermined key performance indices. In this third option, the network remains within the control of the service provider. This third option provides the context for the present application.

It may be considered that one objective of the service provider is to maximize a quantity of admitted virtual networks, thereby maximizing revenue.

FIG. 1 illustrates an environment 100 for aspects of the present application. The environment 100 includes a virtual service provider network 106 with an associated virtual service provider controller 104. The environment 100 further includes a plurality of virtual network users 108 and an associated virtual network operator 102. The virtual service provider controller 104 includes an interface adapted to receive messages from the virtual network operator 102 and an interface adapted to transmit messages to the virtual network operator 102. The plurality of virtual network users 108 may be called the user population 108 of the virtual network operator 102. Notably, the virtual service provider network 106 may employ multiple physical networks, some or all of which may be operated by third party operators.

In implementations, the virtual network operator 102 and the virtual service provider controller 104 will be two separate entities (hardware and software, or only software modules) owned and operated by two separate organizations. In some implementations, however, the virtual network operator 102 and the virtual service provider controller 104 may be owned and operated by the same vendor using the same hardware and software. The virtual network operator 102 and the virtual service provider controller 104 may individually be associated with a network operator, a connectivity service provider or a Cloud service provider, for but three examples of many.

Notably, the virtual service provider controller 104 and the virtual service provider network 106 may be operated by the same owner using proprietary software. Indeed, all three (the virtual network operator 102, the virtual service provider controller 104, the virtual service provider network 106) may be operated by the same owner using propriety software.

The virtual network operator 102 may include a processor (not shown) and a memory (not shown) for storing instructions executable by the processor, to carry out tasks to be performed by the virtual network operator 102. Similarly, the virtual service provider controller 104 may include a processor (not shown) and a memory (not shown) for storing instructions executable by the processor, to carry out tasks to be performed by the virtual service provider controller 104.

Figure 2:
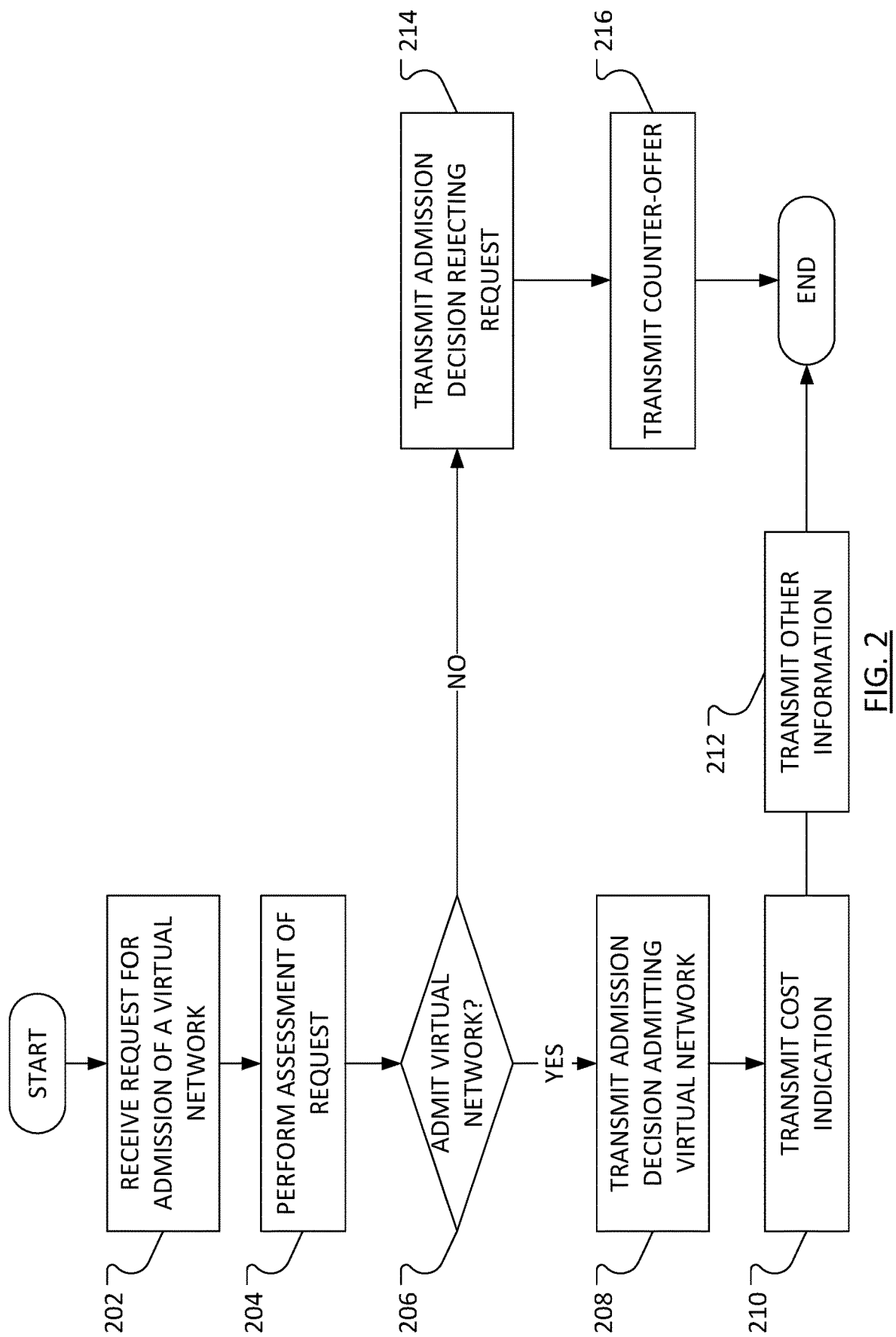
FIG. 2 illustrates steps of an example method receiving a request, assessing the request and admitting a virtual network.

In overview, in view of the environment 100 of FIG. 1 and in view of FIG. 2, which illustrates steps of an example method of admitting a virtual network, the virtual network operator 102 transmits 110 a request for admission of a virtual network to the virtual service provider controller 104. The request specifies terms and conditions for use, by the plurality of virtual network users 108, of resources of the virtual service provider network 106. In some embodiments, the request, which is received by the controller 104 in step 202, includes both a temporal and geographic distribution of traffic demands in the service area. Responsive to receiving (step 202) the request, the controller 104 performs (step 204) an assessment. Based on a result of the assessment, the controller 104 determines (step 206) whether to admit the virtual network or reject the request. Responsive to the determining, the controller 104 transmits 112 (step 208 or step 214) an "admission decision" to the virtual network operator 102.

The terms and conditions specified in the request may, for example, include a geographic traffic density distribution specified for each of a plurality of different time periods (e.g., each hour in a week). The request may, for another example, indicate Quality of Service (QoS) requirements. The request may, for an even further example, specify key performance indices for the requested virtual network.

The result of the assessment may, for example, be based upon four factors.

A first factor, among the four factors, may be obtained, by the controller 104, from a probability density database. If X is a random variable with a particular type of probability density distribution, then the probability that X is greater than some number x, may be given by a particular formula. For the purposes of the present application, it has been found that the known "Pareto" distribution provides suitable accuracy.

Accordingly, a probability density database of "capacity boundaries" generically, or "Pareto boundaries" in the case wherein the Pareto distribution is selected, may be predetermined for use by the controller 104 when determining whether to admit a new virtual network. In one instance, the capacity boundaries may be determined based on mixed traffic scenarios. In another instance, the capacity boundaries may be determined based on demand in a reference traffic model.

A second factor, among the four factors, may be obtained, by the controller 104, from the request for the virtual network. The request may provide information regarding geographic distribution of traffic density. In one instance, the geographic distribution of traffic density may be provided directly within the request. In another instance, the request may include data to allow the controller 104 to determine the geographic distribution of traffic density. Among the data that may be included in the request there may be indications of service types with session arrival, holding and departure statistics. Among the data that may be included in the request there may also be indications of user types along with a probability of using each of a plurality of service types for each user type. Among the data that may be included in the request there may also be indications of probability of each user type among a plurality of user types. One skilled in the art will appreciate that in existing networks, traffic volumes over very large areas are specified. By specifying the geographic and temporal traffic distributions on a sufficiently fine scale, the VNO 102 allows the service provider controller 104 to determine if there is sufficient capacity in the required locations at the specified times. This allows a temporal and geographic multiplexing of the requirements of a particular virtual network operator with other VNOs supported by the service provider network 106.

A third factor, among the four factors, may be obtained, by the controller 104, from the request for the virtual network. The request may provide key performance indices such as: acceptable blocking probability for each class of traffic among a plurality of classes of traffic; a penalty associated with blocking each class of traffic; drop probability (may be defined for different loading situations); a penalty associated with dropping each class of traffic; and percentage happy users among admitted users. Notably, the referenced penalties may differ with dependence upon location and type of service.

A fourth factor, among the four factors, may be determined by the controller 104. The fourth factor may be characterized as the second and third factors for the already-admitted virtual networks. That is, when considering whether to admit a new virtual network, the controller 104 may consider the geographical distribution of the traffic density associated with already-admitted virtual networks and may consider the key performance indices of the already-admitted virtual networks.

It has been discussed above that a request for admission of a new virtual network may provide information regarding geographic distribution of traffic density. More particularly, the geographic traffic density distribution information may be expressed as one or more parameters. Furthermore, there may be distinct parameters for each traffic type and for each time period. Example parameters include mean traffic type, session statistics, geographic source packet distribution and QoS requirements.

It should be understood that at least a portion of the users of the virtual network to which the request is related are likely to be mobile users that connect using mobile data networks. Many mobile data networks are based on cell sites. A given cell site may be associated with a cell coverage area. However, the cell coverage area of one cell site may overlap with the cell coverage area of at least one other cell site. Accordingly, for the purposes of determining geographic traffic density distribution information, cell coverage areas may be divided into a plurality of sub areas. One skilled in the art will appreciate that coverage provided by the service provider 106 need not be cellular in nature.

The sub areas may be defined according to nearest base station and other path loss characteristics. For each sub area, the amount of traffic of each traffic type may be included as a parameter among the geographic traffic density distribution information.

The sub areas may, alternatively, be defined according to historical records of observation of traffic distribution and user profile distribution. For each sub area, a covariance and a mean value of traffic density may be included as parameters among the geographic traffic density distribution information for each traffic type.

For the full general area, average traffic distribution statistics may be included for each traffic type. In particular, a covariance and a mean value of traffic density may be included as parameters among the geographic traffic density distribution information for each traffic type.

A request for admission of a new virtual network may provide information regarding key performance indices. More particularly, one key performance index (KPI) may be expressed as a Quality of Experience requirement for each traffic type. An example KPI is a requirement that no more than 2% of sessions may be in outage at any one time.

The request may include information beyond the information that is useful to the controller 104 for performing an assessment. More particularly, the request may include an indication of measurements that the virtual service provider network 106 can provide to the virtual network operator 102. Such measurements allow the virtual network operator 102 to determine an appropriate fee to charge each user. Beyond measurements, the request may include an indication of one or more monitoring mechanisms that the virtual network operator 102 would like the virtual service provider to use to monitor the traffic in the virtual network, once the virtual network has been admitted. Furthermore, the request may include an indication of penalties to be assessed when the services provided by the virtual service provider fail to meet the agreed upon service requirements.

Responsive to determining (step 206, FIG. 2) whether to admit the virtual network or reject the request, the controller 104 transmits 112 (step 208 or step 214) an admission decision to the virtual network operator 102. If the admission decision indicates that the virtual network is to be admitted (step 208), the controller 104 may also transmit 112 (step 210), to the virtual network operator 102, an indication of the cost associated with provision of the virtual network. Also, responsive to determining (step 206) that the requested the virtual network is to be admitted, the controller 104 may update a record of available resources.

If the admission decision indicates that request is rejected (step 214), that is, that a virtual network under the conditions (e.g., geographical traffic density distribution, key performance indices) specified in the request is not to be admitted, the controller 104 may also transmit 112 (step 216) a counter-offer. In one example, the counter-offer may specify a geographical traffic density distribution that is different from the geographical traffic density distribution specified in the request. In another example, the counter-offer may specify key performance indices that are different from the key performance indices specified in the request. In each example, the controller 104 may attempt to keep the conditions close to the conditions specified in the request, while making adjustments that lead to a request that is more likely to lead to an admitted virtual network.

After the controller 104 has transmitted 112 an admission decision indicating that the requested virtual network has been admitted (step 208), the controller 104 may also transmit 112 (step 210), to the virtual network operator 102, an indication of the cost associated with provision of the virtual network.

After a virtual network has been admitted (step 208), the controller 104 may also transmit 112 (step 212), to the virtual network operator 102, "other" information. The other information may, for one example, include performance statistics for the user population 108 of the virtual network operator 102. The other information may, for another example, include an indication of resources used by the user population 108 of the virtual network operator 102. The other information may, for a further example, include an indication of per user 108 usage statistics including location distributions. The other information may, for an even further example, include an indication of per application statistics. The other information may, for a still further example, include an indication of network status information. The availability of network status information may apply when the admission control of individual sessions in the virtual network is accomplished by the virtual network operator 102. The network status information may include a virtual topology. The network status information may include current loading. The network status information may include a location-based spectral efficiency database.

The other information may, for a still further example, include a location-based resource cost database. The other information may, for a still further example, include user movement prediction schemes.

Figure 3:
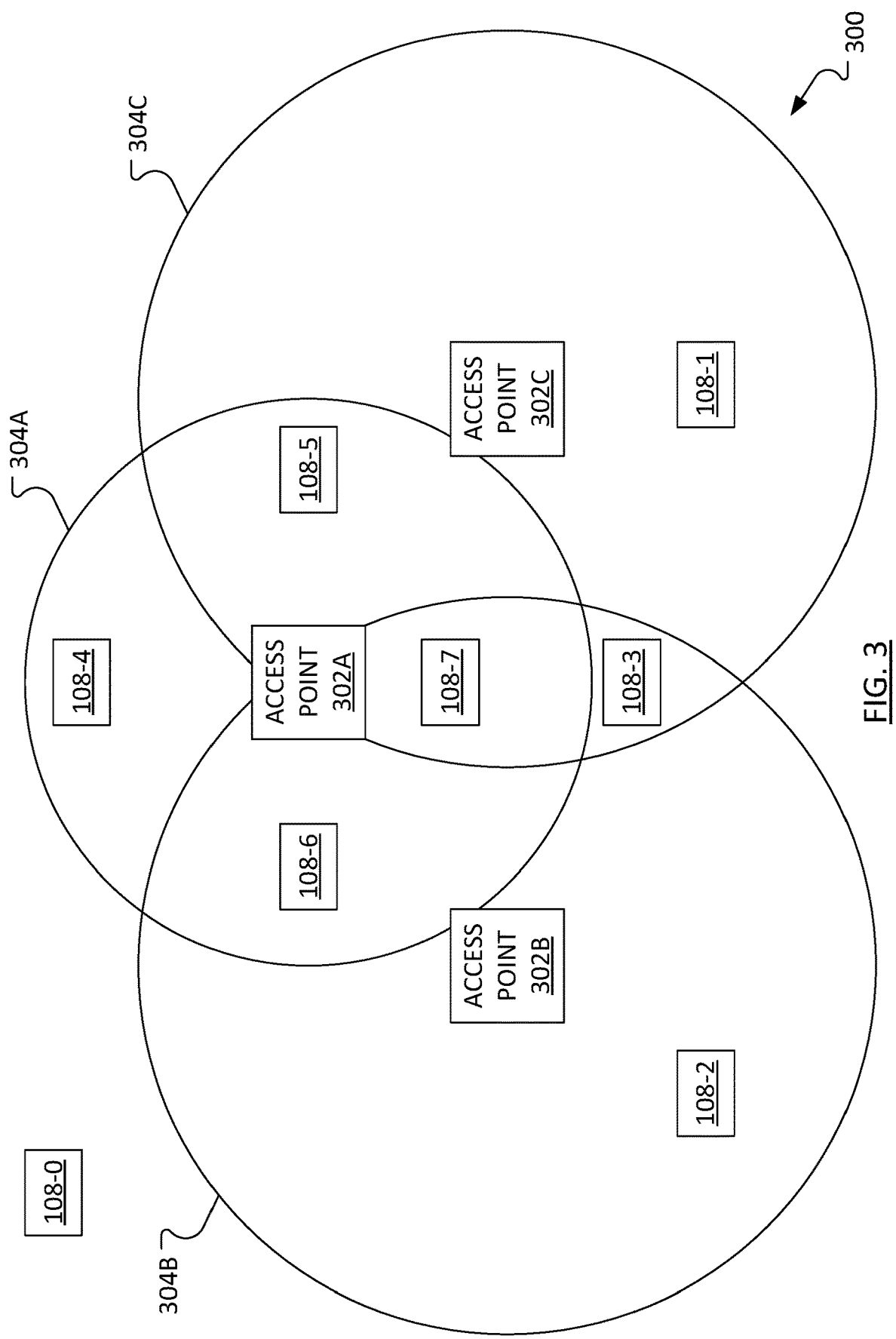
FIG. 3 illustrates an environment including three wireless communication access points and their respective coverage areas.

FIG. 3 illustrates an environment 300 including three wireless communication access points and their respective coverage areas. The first access point is designated reference numeral 302A. The second access point is designated reference numeral 302B. The third access point is designated reference numeral 302C. Access point 302A has a coverage area 304A. Access points 302B and 302C have coverage areas 304B and 304C respectively.

A plurality of the virtual network users 108 of FIG. 1 are scattered about the environment 300 of FIG. 3. The virtual network users 108 are associated with specific reference numerals 108-0, 108-1, 108-2, 108-3, 108-4, 108-5, 108-6, and 108-7. It should be understood that there may be more or fewer virtual network users 108 scattered about the environment 300 of FIG. 3. Similarly, there may be more or fewer access points 302 with respective coverage areas 304 within the environment 300 of FIG. 3.

To express geographic traffic density distribution in a request for a virtual network, the virtual network operator 102 may provide traffic density information for a plurality of regions. In one instance, the regions may be defined based upon signal strength, and consequent interference, within an environment with multiple access points. Using the environment 300 of FIG. 3 as an example, when there are three access points and a single threshold signal level, the environment 300 may be divided into eight effective traffic source regions. These regions may also be referenced as "bins."

In a zeroth region, where the zeroth virtual network user 108-0 is positioned, signal strength from all three access points 302 is below the threshold. (ABC=000, where "0" represents "below threshold" and "1" represents "above threshold")

In a first region, where the first virtual network user 108-1 is positioned, signal strength from the third access point 302C is above the threshold and signal strength from the first access point 302A and the second access point 302B is below the threshold. (ABC=001)

In a second region, where the second virtual network user 108-2 is positioned, signal strength from the second access point 302B is above the threshold and signal strength from the first access point 302A and the third access point 302C is below the threshold. (ABC=010)

In a third region, where the third virtual network user 108-3 is positioned, signal strength from the second access point 302B and the third access point 302C is above the threshold and signal strength from the first access point 302A is below the threshold. (ABC=011)

In a fourth region, where the fourth virtual network user 108-4 is positioned, signal strength from the first access point 302A is above the threshold and signal strength from the second access point 302C and the third access point 302C is below the threshold. (ABC=100)

In a fifth region, where the fifth virtual network user 108-5 is positioned, signal strength from the first access point 302A and the third access point 302C is above the threshold and signal strength from the second access point 302B is below the threshold. (ABC=101)

In a sixth region, where the sixth virtual network user 108-6 is positioned, signal strength from the first access point 302A and the second access point 302B is above the threshold and signal strength from the third access point 302C is below the threshold. (ABC=110)

In a seventh region, where the seventh virtual network user 108-7 is positioned, signal strength from all three access points 302 is above the threshold. (ABC=111)

Notably, the single threshold approach is only an example. The regions may also be defined on the basis of two thresholds. In such a further example, a triple digit representation may be defined where "0" represents "below first threshold," "1" represents "above first threshold and below second threshold" and "2" represents "above second threshold." Twelve regions may be defined according to triple digit representations: 000; 001; 010; 011; 100; 101; 110; 111; 200; 201; 210; and 211.

The controller 104 transmits an indication of the regions (or of region boundaries) to the virtual network operator 102.

Subsequently, as part of a virtual network admission request, the virtual network operator 102 may provide traffic density information for each region of a plurality of defined regions for each time period among a plurality of defined time periods (e.g., for different times of the day).

Accordingly, when performing (step 204, FIG. 2) the assessment of the request, the virtual service provider controller 104 may aggregate (step 402) the traffic density information for each region and for each time period with traffic density information for each region and each time period for virtual networks that have already been admitted to the virtual service provider network 106. The virtual service provider controller 104 may then determine (step 404) whether the aggregated traffic exceeds the predetermined capacities.

Figure 4:
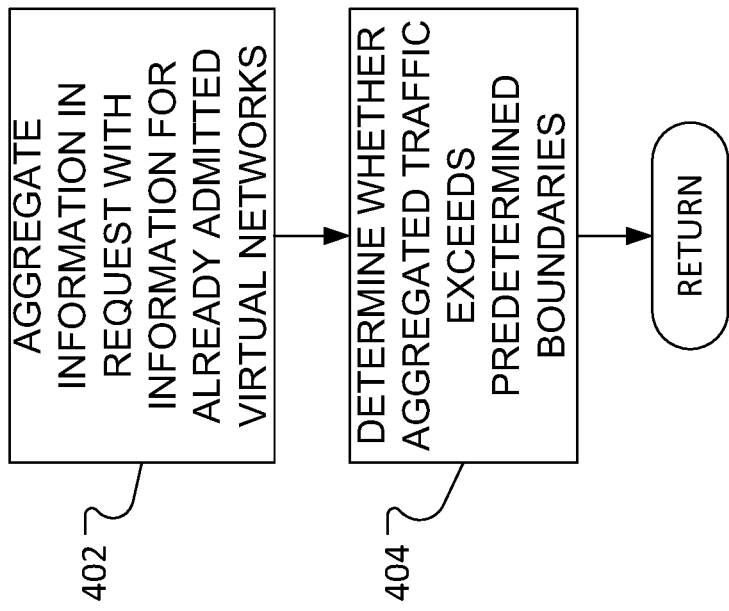
FIG. 4 illustrates example steps in the assessment of the request of the method illustrated in FIG. 2.

Notably, the aggregation of step 402 of FIG. 4 is straightforward when the type of traffic specified in the request matches the type of traffic for the virtual networks that have already been admitted. However, this may not be the case.

Figure 5:
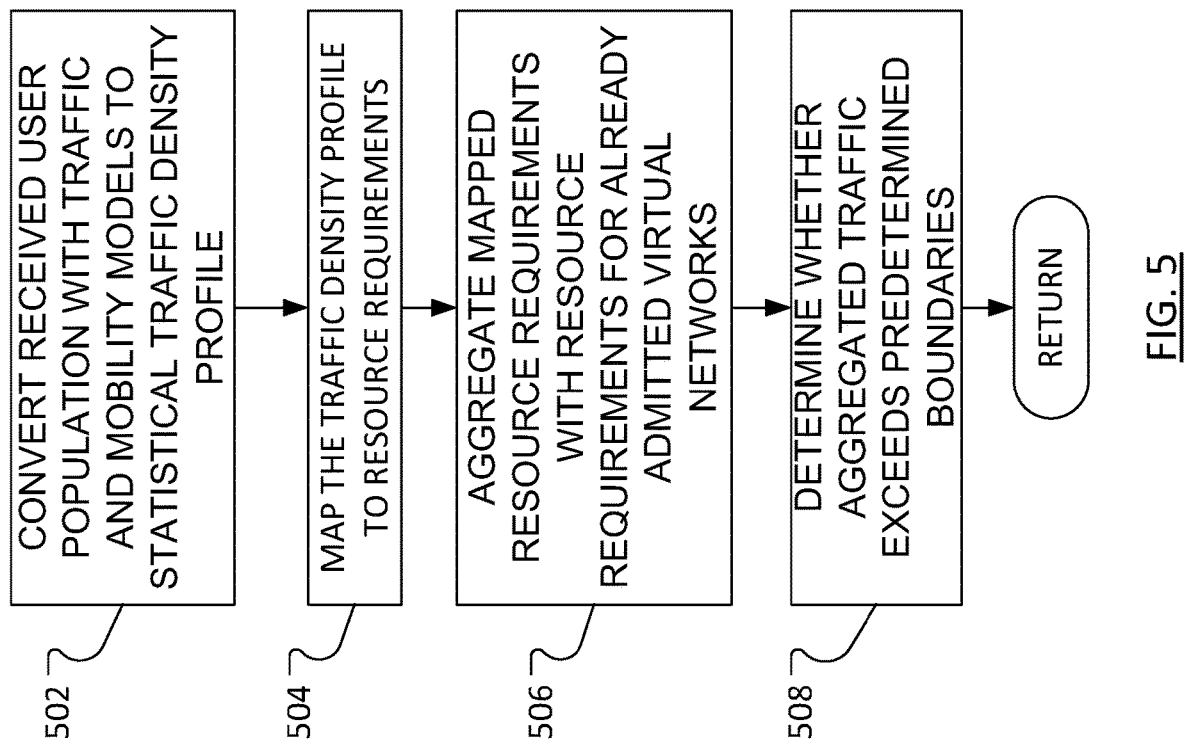
FIG. 5 illustrates example steps in the assessment of the request of the method illustrated in FIG. 2.

When the type of traffic specified in the request differs from the type of traffic for the virtual networks that have already been admitted, the resource requirements are different and it may not be possible to carry out the aggregation of step 506 of FIG. 5 in as straightforward a manner.

Accordingly, the consideration of the present application turns to a situation defined by multiple traffic density profiles and different traffic types. It might be considered that resource usage could be determined on a per bit basis. Notably, an ongoing resource usage (or an expected resource requirement) per bit for a given service may be considered to be not only a function of spectral efficiency (or location) but also a function of traffic type and associated QoS requirements.

If the assessment described in conjunction with FIG. 4 was to be attempted in the situation wherein there are multiple traffic types (traffic with distinct QoS requirements or different key performance indices), it would be expected that the virtual service provider controller 104 would predetermine capacity boundaries for each combination of possible traffic mixes.

However, in view of perhaps 1,000 distinct QoS traffic types and 100 different key performance indices and 10,000 different geographical distributions, it would be necessary to find capacity boundaries for $10^{20}$ combined scenarios. Clearly, some simplification would assist in reducing this vast number of possible combined scenarios.

One option for reducing the number of traffic mix combinations involves geographically aggregating traffic density distributions, from different virtual networks, for traffic with the same QoS type and key performance index type.

Another option for reducing the number of traffic mix combinations involves mapping each of a plurality of traffic density distributions to an equivalent traffic demand distribution. As a result of the mapping, a single distribution for homogeneous (reference) traffic is obtained. The single distribution may be compared to capacity boundaries.

Instead of keeping database records for each application with corresponding distinct QoS traffic type, the full range of QoS parameters may be quantized into sub-ranges. As a result of the quantization, 1,000 distinct QoS traffic types may be reduced to significantly fewer sub-ranges.

The number of key performance indices can also be reduced by selecting the subset of the values that are likely to be used, rather than all of the possible values.

Geographical distributions may be modeled with fewer parameters by, in one model, employing three parameters: traffic density distribution covariance; correlation to the access points; and mean traffic demand.

Furthermore, to reduce the number of capacity borders for each situation, the full space may be quantized and solutions may be localized to only depend on a limited number of neighbors.

In another embodiment, the admissibility of a new virtual network may be determined, that is, the assessment (step 204, FIG. 2) of the request may be performed, by first obtaining aggregated traffic as explained above and by then modeling variation in the aggregated traffic in a simulator. Subsequently, a known Traffic Engineering (TE) optimization algorithm may be executed to determine whether the key performance indices can be met for randomly generated traffic snap shots with the same statistics. Upon determining that the key performance indices are met for the traffic density profiles specified for the time zones, the new virtual network can be admitted.

Unfortunately, the strategy proposed hereinbefore for reducing situations for which capacity boundaries are to be predetermined, the virtual network operator 102 specifies expected traffic densities for each of the types of traffic and key performance indices for each of the types of traffic. Furthermore, the number of capacity boundaries predetermined by the virtual service provider controller 104 is still likely to be so large as to be a nearly intractable problem.

Instead, it is proposed herein to convert a traffic density related to traffic of one traffic type to an equivalent traffic density for a reference traffic type. The conversion may be accomplished through the addition of a resource usage factor to the demand density. The resource usage factor may be called the Service Cost Index or "SCI." Subsequent to converting the traffic density, the traffic may be aggregated as homogenous traffic.

For this proposal, capacity boundaries for converted traffic distribution densities are found using simulations and stored in the capacity boundary database for equivalent traffic bit densities.

To find the SCI for different key performance index requirements, the virtual service provider controller 104 may, first, perform simulations with a first key performance index to find traffic density parameters that correspond to each capacity region. Then, the virtual service provider controller 104 may perform simulations with a second key performance index to find traffic density parameters that correspond to each capacity region.

The virtual service provider controller 104 may then take an average capacity ratio to match the same traffic density distribution and use that average capacity ratio to obtain an sbit value for traffic that meets the first key performance index and an sbit value for traffic that meets the second key performance index.

The term "sbit value" is used herein to characterize a service. An sbit value, for a given service, represents an equivalent number of bits of a reference service that can be transported using the amount of resources of the virtual service provider network 106 required to transport one bit of traffic for the given service.

It is proposed herein that the average resource requirement for the same spectral efficiency for different traffic characteristics and other system capacity impacts can be modeled as a weighting factor to take the impact into account. This weighting is termed as "Service Cost Index" or "SCI."

$$SCI = \frac{\text{Resource\_cost\_per\_bit\_of\_a\_reference\_service}}{\text{Resource\_cost\_per\_bit\_of\_service\_A}}$$

$$sbit\ value = \frac{\text{\# of\_bits\_that\_can\_be\_sent\_of\_a\_reference\_service\_using\_a\_resource}}{\text{\# of\_bits\_that\_can\_be\_sent\_of\_service\_A\_using\_the\_same\_resource}}$$

sbit values may be seen as useful for: traffic density aggregation from two virtual networks; the virtual service provider controller 104 determining a rate to charge to the virtual network operator 102; as well as for various dynamic charging mechanisms to the end user 108.

$$SCI = \frac{\text{\# of\_sbits\_or\_\# of\_equivalent\_bits\_of\_reference\_service\_that\_can\_be\_transported}}{\text{\# of\_bits\_transported\_for\_service\_A}}$$

The SCI may be shown to be a function of: traffic characteristics; per user QoS/QoE; and network key performance index characteristics. The traffic characteristics may include, but are not limited to: packet delay; mean packet size and variation; and packet arrival times. Per user QoS/QoE attributes may include: reliability; QoS parameters and QoE, other traffic characteristics which impact the resource usage. Finally, network key performance index characteristics include: network outage probability; cell coverage; and blocking.

Returning to the performance (step 204, FIG. 2) of the assessment of the request, the virtual service provider controller 104 may evaluate effective traffic demand while employing sbit values. Evaluating in this manner may be shown to take into account system-dependent characteristics, such as delay and packet size (different packet sizes and different delays would have different resource requirements based on the system type).

As discussed, spectral efficiency may be converted to a resource requirement and, with dependence upon the traffic characteristics, the controller 104 may evaluate a resource requirement on a per bit basis.

The virtual network operator 102 may prepare a "Performance Database." To prepare the "Performance Database," the virtual network operator 102 may use off-line simulations or historical data to obtain key performance indices for different traffic density profiles. For this purpose, traffic density profiles may be quantized so that the demands closer to the full load situations are made more granular.

Instead of a geographic traffic density distribution, the virtual network operator 102 may specify, in the request, user population with traffic and mobility models. When performing (step 204, FIG. 2) the assessment of the request, the virtual service provider controller 104 may convert (step 502) the received user population with traffic and mobility models to a statistical traffic density profile. The virtual service provider controller 104 may then map (step 504) the statistical traffic density profile to resource requirements. Such a mapping may involve using the Performance Database received, in the request, from the virtual network operator 102.

The virtual service provider controller 104 may then aggregate (step 506) the resource requirements for each region and for each time period with resource requirements for each region and each time period for virtual networks that have already been admitted, by the virtual service provider controller 104, to the virtual service provider network 106. The virtual service provider controller 104 may then evaluate (step 508) aggregated resource requirements per region to serve aggregated traffic density (mean and variation of traffic density distribution).

For the same spectral efficiency (user available data rate) the following traffic characteristics can change the resource requirement: packet size; packet inter-arrival times; delay requirement; and reliability.

Under one loading situation, a traffic source (virtual network user 108) at a given location may be assigned to a first access point, requiring a first amount of resources. Under another loading situation, the same traffic source at the same given location may be assigned to a second access point, requiring a second amount of resources, where the second amount of resources is distinct from the first amount of resources. Therefore, the amount of loading for a particular access point may be considered to depend on a scheduling scheme used and the loading at a given time.

When the virtual service provider controller 104 evaluates the capacity for the virtual service provider network 106 to admit a new virtual network, network key performance indices impact resource usage.

For cost-based admission of a virtual network, the virtual network operator 102 provides, to the virtual service provider controller 104, a geographic region-based traffic distribution for different time periods and the QoE and key performance index requirements. Optionally, the virtual network operator 102 provides, to the virtual service provider controller 104, mobility models.

The virtual network operator 102 may want on-demand charging based on costs or a flat charge based on all the time variability and demand.

For both cases, the virtual service provider controller 104 may first admit a virtual network that is the subject of a request if, according to the assessment (step 204, FIG. 2), the virtual service provider controller 104 determines that the services can be provided with the given key performance indices.

Admission may be based on pre-evaluated Pareto boundaries of costs.

The virtual service provider controller 104 may determine that the service cannot be provided, that is, the virtual network may not be admitted, if the cost is higher than a certain threshold in the Pareto boundaries.

The virtual service provider controller 104 may have pre-evaluated cost models for various traffic distributions and methods so that the costs of providing certain service to a given traffic type at a given location at different load levels, using which the overall Pareto boundaries are defined.

In the case of the on-demand charging model, the virtual service provider controller 104 may offer different charging at different times of day, based on the load and competitiveness with other virtual service providers.

The charging may not exceed a certain threshold agreed under upon under a service level agreement. If temporal network overloading happens, there may be certain provisions in place to disallow certain services. A penalty may be applied.

However, the penalty may be acceptable under certain conditions, such as high demand as the virtual service provider controller 104 may charge higher amount from new virtual networks.

In the flat charging model, since charging cannot be increased, during the admission the virtual service provider controller 104 may ensure consideration of all the peak traffic generation times and the key performance index may be adjusted to match increases in correlated traffic demand.

Figure 6:
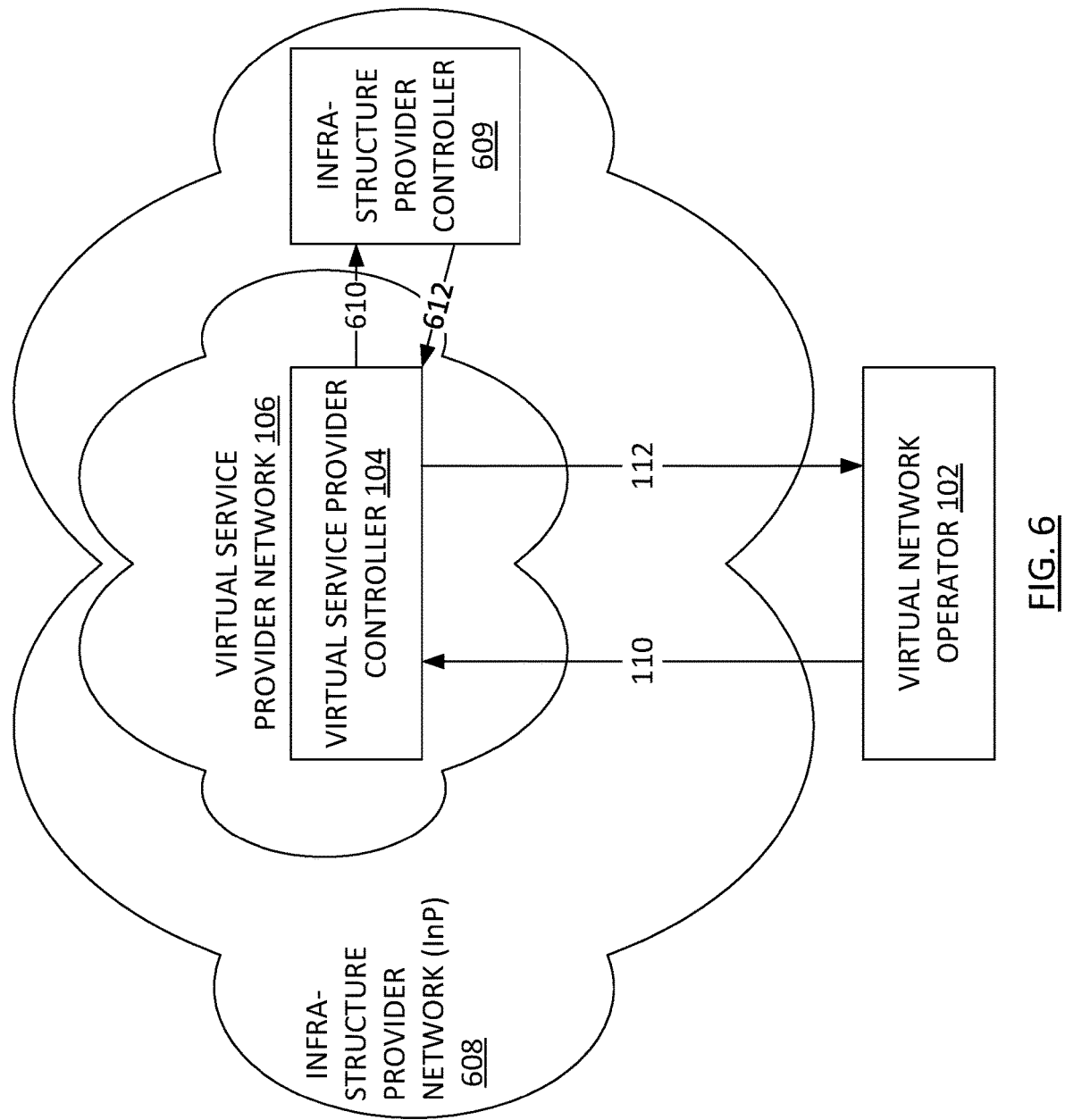
FIG. 6 illustrates an adaptation of the environment of FIG. 1 wherein the virtual service provider network of FIG. 1 is part of an infra-structure provider network controlled by an infra-structure provider network controller.

FIG. 6 illustrates an environment wherein the virtual service provider network 106 of FIG. 1 is part of an infra-structure provider network 608 controlled by an infra-structure provider network controller 609. The infra-structure provider network 608 may provide infrastructure including any or all of a radio access edge nodes, such as wireless access points, base stations and the link, fronthaul and backhaul network connections, data centers providing computing resources, dedicated core networking nodes and other such nodes and resources. The infra-structure provider network 608 and the infra-structure provider network controller 609 may be associated with an entity that may be called an infra-structure provider. The service provider that is associated with the virtual service provider network 106 and the virtual service provider controller 104 may have its own resources, and/or borrow resources from one or more infra-structure providers or use services provided by one or more infra-structure providers. The virtual service provider controller 104 includes an interface adapted to transmit messages to the infra-structure provider network controller 609 and an interface adapted to receive messages from the infra-structure provider network controller 609.

Figure 7:
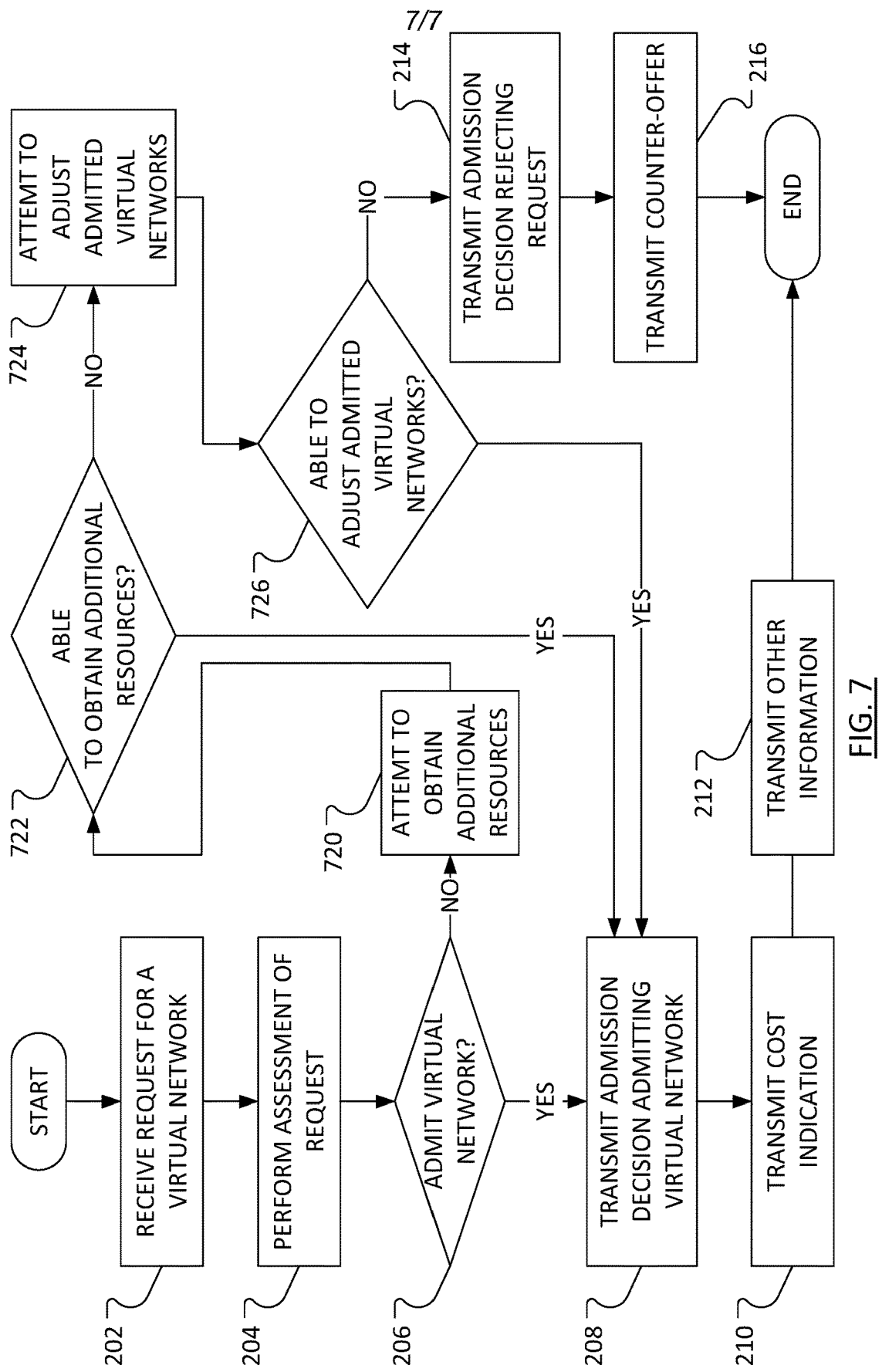
FIG. 7 illustrates steps of an example method of admitting a virtual network adapted from the method illustrated in FIG. 2.

FIG. 7 illustrates steps of an example method of admitting a virtual network adapted from the method illustrated in FIG. 2. In common with the method illustrated in FIG. 2, the controller 104 performs an assessment (step 204) regarding whether to admit a virtual network for which a request has been received (step 202).

Performance, by the controller 104, of the assessment (step 204) has been discussed hereinbefore as involving consideration of one or more factors. One of the factors involves use of a probability density database of "capacity boundaries" generically, or "Pareto boundaries" in the case wherein the Pareto distribution is selected. In one instance, the capacity boundaries may be determined based on use of a PHY abstraction provided by the infra-structure provider network controller 609.

Based on a result of the assessment (step 204), the controller 104 determines (step 206) whether to admit the requested virtual network. Responsive to determining that the virtual service provider network 106 is not able to admit the requested virtual network, the controller 104, instead of directly acting to transmit (step 214) an admission decision that indicates that the request received in step 202 is rejected, may execute one or more alternative courses of action contemplated and presented in FIG. 7.

One of the alternative courses of action involves attempting (step 720) to obtain additional resources from an infra-structure provider, such as InP 608. Such attempting may, in view of FIG. 6, involve transmitting 610, to the infra-structure provider network controller 609, a request for additional resources. Such attempting may, responsive to the transmitting 610, involve receiving 612, from the infra-structure provider network controller 609, a grant of additional resources, a refusal to grant additional resources or an initiation of a negotiation for additional resources. Such a negotiation may involve specifying a price for a given quantity and/or quality of additional resources. It should be noted that, although only one infrastructure provider is shown in FIG. 6, it is possible for the service provider to make use of the resources of a plurality of different InPs that may offer complementary or overlapping services.

Upon determining (step 722) that enough additional resources are available to allow the virtual service provider network 106 to admit the requested virtual network, the controller 104 may proceed to transmit (step 208) an admission decision indicating that the requested virtual network has been admitted and the method may carry on in a manner consistent with the method of FIG. 2.

Another of the alternative courses of action involves attempting (step 724) to adjust the resources already allocated to already-admitted virtual networks. As discussed hereinbefore, the request received in step 202 may include an indication of penalties to be assessed when the services provided by the virtual service provider fail to meet the agreed upon service requirements.

Upon determining (step 722) that the infra-structure provider network controller 609 has refused to grant additional resources or determining (step 722), through negotiations, that the additional resources are too expensive to justify, the controller 104 may attempt (step 724) to adjust the resources already allocated to admitted virtual networks. That is, the controller 104 may assess, perhaps based on historical data, the likelihood that admission of the requested virtual network will cause the virtual service provider network 106 to fail to meet the agreed upon service requirements for the already admitted virtual networks. The controller 104 may also assess the likely cost of such failure.

Upon determining (step 726) that the resources already allocated to admitted virtual networks may be adjusted at a reasonable cost, the controller 104 may proceed to transmit (step 208) an admission decision indicating that the requested virtual network has been admitted and the method may carry on in a manner consistent with the method of FIG. 2. The assessment of reasonable cost may involve comparing a combination of penalties and a likelihood of penalties to a reasonableness threshold value.

Notably, much of the assessment regarding admitting or rejecting a given request for a virtual network relies upon statistical representations of traffic flow. It may be anticipated, in negotiations between the virtual network operator 102 and the controller 104, that, occasionally, dynamic traffic flow in an admitted virtual network can exceed agreed-upon levels of service to be provided by the virtual service provider network 106.

In those scenarios wherein the controller 104 has an established relationship with the infra-structure provider network controller 609, it is contemplated that the controller 104 may transmit 610, to the infra-structure provider network controller 609, a request for additional resources. The infra-structure provider network controller 609 may respond 612 to the request with an admission, a rejection or a negotiation. In the latter case, the cost of temporary additional resources may be set, by the infra-structure provider network controller 609, based on such factors as a current demand for resources within the infra-structure provider network 608.

Upon determining (step 726) that the resources already allocated to admitted virtual networks may not be adjusted at a reasonable cost, the controller 104 may proceed to transmit (step 214) an admission decision indicating that the requested virtual network has been rejected and the method may carry on in a manner consistent with the method of FIG. 2 with the transmission (step 216) of a counter-offer.

Alternatively, rather than transmit a counter-offer, the controller 104 may provide, to the virtual network operator 102, a graphical user interface (GUI) to allow a person associated with the virtual network operator 102 to adjust elements of the previously transmitted request. Each of the factors of the request, such as geographical factors, temporal factors, user population factors, percentage of active users in a given geographical area, service type factors, peak rate factors, service outage rate factors, blocking rate factors, service quality factors (set up time, etc.) and coverage factors, may be associated, in the GUI, with a range. Each of the ranges may be associated with a slider. Based on the position in the range for a given factor, in combination with all the other factors, the GUI may display an indication of whether a requested virtual network may be admitted or rejected. In the event that the GUI indicates that a requested virtual network may be admitted, a cost of admitting the requested virtual network may also be displayed. Furthermore, the person associated with the virtual network operator 102 may adjust multiple sliders for respective factors to find a set of factors that allows a virtual network to be admitted and fits within a pre-determined budget.

Conveniently, the ability to transmit 610, to the infra-structure provider network controller 609, a request for additional resources provides a degree of dynamism that may be used to set apart the virtual service provider network 106 adapted to implement aspects of the present application from other, competing, virtual service provider networks.

It is further contemplated that the virtual service provider network 106 may obtain resources from more than one infra-structure provider network. In such a scenario, at the point wherein the controller 104 attempts (step 720) to obtain additional resources, multiple infra-structure provider networks may compete to provide the resources. Such competition may drive costs down for the virtual service provider network 106 and at least some of the cost savings may be passed to the customers of the virtual service provider network 106.

It is contemplated that aspects of the present application will allow for geographical and temporal multiplexing of virtual network operating customers of the virtual service provider network 106. Indeed, multiple customers may be served by the virtual service provider network 106 at a given geographical area and at a given time of day, provided that the controller 104 has determined that the virtual service provider network 106 has appropriate resources for that time and place.

In review, there are several avenues for messaging within the network of FIG. 6. Messages 110 from the virtual network operator 102 to the controller 104 include messages related to an admission phase, a set up phase and a user traffic handling phase. In the admission phase, messages are expected to relate to descriptions of requested traffic parameters, degree of monitoring, cost, functional and performance specification. Messages 112 from the controller 104 to the virtual network operator 102 include admission and rejection messages along with any messages related to negotiating admission of a given virtual network. Messages 610 from the controller 104 to the infra-structure provider network controller 609 may include requests for additional resources. Messages 612 from the infra-structure provider network controller 609 to the controller 104 may include responses to the requests for additional resources.

Messages 110 from the virtual network operator 102 to the controller 104 in the admission phase include information regarding the requested virtual network traffic distribution, security, cost, service requirements and network performance requirements. Admission phase messages 110 also include indications of virtual network security requirements and per service requirements (e.g., encryption, authentication). Admission phase messages 110 also include acceptable per network user and/or per service outage time for different geographical areas. Admission phase messages 110 also include indications of requested reliability. Admission phase messages 110 also include indications of limits on configuration/set-up costs, service charges, etc. Admission phase messages 110 also include indications of application-specific requirements (maximum delay, jitter, protocols, functional requirements). In the case wherein the virtual network is topology-based, the admission phase messages 110 also include indications of other considerations (bandwidth demands per link, bandwidth as a traffic matrix, minimum availability, maximum end-to-end packet loss, maximum hop-by-hop packet loss). Admission phase messages 110 also include indications of measurement and monitoring mechanisms for policing, assessing penalties, charging and learning subscriber behaviors. When the request is rejected and limitations are specified in the rejection message, messages 110 from the virtual network operator 102 to the controller 104 in the admission phase may include a counter request.

After a requested virtual network has been admitted, messages 110 from the virtual network operator 102 to the controller 104 in the setup phase may include a message to indicate a user identification method to the controller 104. Further messages 110 from the virtual network operator 102 to the controller 104 in the setup phase may include indications of security and other special functions and protocols.

After a requested virtual network has been setup, messages 110 from the virtual network operator 102 to the controller 104 may include indications of session admission or session rejection, if session admission is controlled by the virtual network operator 102. Further messages 110 from the virtual network operator 102 to the controller 104 may include session monitoring information.

Messages 112 from the controller 104 to the virtual network operator 102 may include, as discussed hereinbefore, an admission decision. If the requested virtual network is admitted, the messages 112 may include an indication of costs. If the requested virtual network is rejected, the messages 112 may include a counter offer. Further messages 112 from the controller 104 to the virtual network operator 102 may include performance statistics for the user population associated with the virtual network operator 102. Messages 112 from the controller 104 to the virtual network operator 102 may also include an indication of resources used by the user population associated with the virtual network operator 102 and an indication of an associated cost to be charged to the virtual network operator 102. Messages 112 from the controller 104 to the virtual network operator 102 may further include per user usage statistics, including location distributions and application-specific statistics. Messages 112 from the controller 104 to the virtual network operator 102 may further include network status information, which may include virtual topology. When the admission control of individual sessions is handled by the virtual network operator 102, the virtual topology may include, for example, indications of current loading and a location-based session database. Messages 112 from the controller 104 to the virtual network operator 102 may further include a location-based resource cost database and User movement prediction schemes. Messages 112 from the controller 104 to the virtual network operator 102 may further include traffic distribution measurements and suggested adjustments to agreed-upon parameters for the admitted virtual network. Upon admission of a virtual network, messages 112 from the controller 104 to the virtual network operator 102 may further include an indication of a virtual network operator identifier (an VNO-ID). Messages 112 from the controller 104 to the virtual network operator 102 may further include indications of usage privilege and charging policies.

According to an aspect of the present disclosure, there is provided a method of requesting admission of a virtual network, the method comprising transmitting, to a service provider, a request for admission of a virtual network, the request including a temporal distribution of first traffic across a series of geographic regions forming a subset of the geographic coverage of the service provider. The method may also include determining a first resource cost for providing the first traffic type with the given physical characteristics, determining a second resource cost for providing the second traffic type with the physical characteristics, generating a ratio of the first resource cost to the second resource cost, transmitting the request including the first indication, the second indication and the ratio and receiving, from the virtual service provider controller, an admission decision admitting the virtual network.

According to an aspect of the present disclosure, there is provided a virtual network operator comprising a processor operable to determine a first resource cost for providing the first traffic type with the given physical characteristics, determine a second resource cost for providing the second traffic type with the physical characteristics and generate a ratio of the first resource cost to the second resource cost.

According to an aspect of the present disclosure, there is provided a method of assessing admission of a requested virtual network, the method including receiving, from a virtual network operator, a request for a virtual network, the request including a first indication of geographic and temporal distribution of first traffic, as defined for a plurality of regions and a plurality of time periods, the first traffic having a first traffic type with given physical characteristics, a second indication of geographic and temporal distribution of second traffic, as defined for the plurality of regions and the plurality of time zones, the second traffic having a second traffic type and a ratio of a first resource cost to a second resource cost, the first resource cost for providing the first traffic type with the given physical characteristics and the second resource cost for providing the second traffic type with the physical characteristics. The method further includes converting, using the ratio, the second indication of geographic and temporal distribution so that the second traffic is characterized as the first traffic type, thereby providing a converted second distribution, aggregating the first distribution of the first traffic with the converted second distribution of the second traffic, to give aggregated traffic, determining that the aggregated traffic does not exceed predetermined capacity boundaries and responsive to the determining, admitting the virtual network. The physical characteristics may comprise a signal to noise plus interference ratio.

According to an aspect of the present disclosure, there is provided a virtual service provider controller comprising a processor operable to receive, from a virtual network operator, a request for a virtual network, the request including a first indication of geographic and temporal distribution of first traffic, as defined for a plurality of regions and a plurality of time periods, the first traffic having a first traffic type with given physical characteristics, a second indication of geographic and temporal distribution of second traffic, as defined for the plurality of regions and the plurality of time zones, the second traffic having a second traffic type and a ratio of a first resource cost to a second resource cost, the first resource cost for providing the first traffic type with the given physical characteristics and the second resource cost for providing the second traffic type with the physical characteristics. The processor being further operable to convert, using the ratio, the second indication of geographic and temporal distribution so that the second traffic is characterized as the first traffic type, thereby providing a converted second distribution, aggregate the first distribution of the first traffic with the converted second distribution of the second traffic, to give aggregated traffic, determine that the aggregated traffic does not exceed predetermined capacity boundaries and admit the virtual network.

According to an aspect of the present disclosure, there is provided a method of characterizing a first traffic type, the first traffic type categorized according to a first combination of quantized Quality of Service ranges, the method including determining a first value for a number of bits of a reference traffic type that can be transmitted using a resource in an environment, determining a second value for a number of bits of the first traffic type that can be transmitted using the resource in the environment, determining a first ratio of the first value to the second value and storing, in a database, the first ratio associated with a first reference to the first traffic type. The method may include repeating the determining values for a second traffic type, the second traffic type categorized according to a second combination of quantized Quality of Service ranges, thereby allowing for determining a second ratio. The method may include storing, in the database, the second ratio associated with a second reference to the second traffic type.

According to an aspect of the present disclosure, there is provided a method of requesting a virtual network, the method including generating a first indication of geographic and temporal distribution of first traffic, as defined for a plurality of regions and a plurality of time periods, the first traffic having a first performance index requirement, generating a second indication of geographic and temporal distribution of second traffic, as defined for the plurality of regions and the plurality of time zones, the second traffic having a second performance index requirement, determining a first resource cost for providing traffic meeting the first performance index requirement, determining a second resource cost for providing the second traffic meeting the second performance index requirement, generating a ratio of the first resource cost to the second resource cost, transmitting, to a virtual service provider controller, a request for a virtual network, the request including the first indication, the second indication and the ratio and receiving, from the virtual service provider controller, an admission decision admitting the virtual network.

According to an aspect of the present disclosure, there is provided a virtual network operator comprising processor operable to generate a first indication of geographic and temporal distribution of first traffic, as defined for a plurality of regions and a plurality of time periods, the first traffic having a first performance index requirement, generate a second indication of geographic and temporal distribution of second traffic, as defined for the plurality of regions and the plurality of time zones, the second traffic having a second performance index requirement, determine a first resource cost for providing traffic meeting the first performance index requirement, determine a second resource cost for providing the second traffic meeting the second performance index requirement, generate a ratio of the first resource cost to the second resource cost, transmit, to a virtual service provider controller, a request for a virtual network, the request including the first indication, the second indication and the ratio and receive, from the virtual service provider controller, an admission decision admitting the virtual network.

According to an aspect of the present disclosure, there is provided a method of assessing admission of a requested virtual network, the method including receiving, from a virtual network operator, a request for a virtual network, the request including a first indication of geographic and temporal distribution of first traffic, as defined for a plurality of regions and a plurality of time periods, the first traffic having a first performance index requirement, a second indication of geographic and temporal distribution of second traffic, as defined for the plurality of regions and the plurality of time zones, the second traffic having a second performance index requirement and a ratio of a first resource cost to a second resource cost, the first resource cost for providing traffic meeting the first performance index requirement and the second resource cost for providing traffic meeting the second performance index requirement. The method further including converting, using the ratio, the second indication of geographic and temporal distribution so that the second traffic is characterized as traffic having the first performance index requirement, thereby providing a converted second distribution, aggregating the first distribution of the first traffic with the converted second distribution of the second traffic, to give aggregated traffic, determining that the aggregated traffic does not exceed predetermined capacity boundaries and responsive to the determining, admitting the virtual network.

According to an aspect of the present disclosure, there is provided a virtual service provider controller comprising a processor operable to receive, from a virtual network operator, a request for a virtual network, the request including a first indication of geographic and temporal distribution of first traffic, as defined for a plurality of regions and a plurality of time periods, the first traffic having a first performance index requirement, a second indication of geographic and temporal distribution of second traffic, as defined for the plurality of regions and the plurality of time zones, the second traffic having a second performance index requirement and a ratio of a first resource cost to a second resource cost, the first resource cost for providing traffic meeting the first performance index requirement and the second resource cost for providing traffic meeting the second performance index requirement. The processor being further operable to convert, using the ratio, the second indication of geographic and temporal distribution so that the second traffic is characterized as traffic having the first performance index requirement, thereby providing a converted second distribution, aggregate the first distribution of the first traffic with the converted second distribution of the second traffic, to give aggregated traffic, determine that the aggregated traffic does not exceed predetermined capacity boundaries and admit the virtual network.

According to an aspect of the present disclosure, there is provided a method of requesting admission of a virtual network. The method includes transmitting, to a service provider, a request for admission of a virtual network, the request including a temporal distribution of traffic across a series of geographic regions forming a subset of the geographic coverage of the service provider. The method may include receiving, from the virtual service provider controller, definitions for the plurality of regions and receiving, from the virtual service provider controller, definitions for the plurality of time periods.

According to an aspect of the present disclosure, there is provided a virtual network operator comprising a processor operable to transmit, to a service provider, a request for admission of a virtual network, the request including a temporal distribution of traffic across a series of geographic regions forming a subset of the geographic coverage of the service provider.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of admitting a virtual network comprising:
    receiving, by a virtual service provider controller having a processor and a memory, from a virtual network operator, a request for admission of a virtual network, the request including an indicator of traffic distribution, the indicator including indication of at least one of geographic and temporal distribution of traffic, as defined for at least one of: one or more regions, and one or more time periods, wherein the indicated traffic distribution includes indication of traffic distribution for specific traffic types;
    determining, based on the received request, that the indicated traffic distribution is serviceable by the virtual service provider controller, wherein determining that the indicated traffic distribution is serviceable comprises mapping traffic density distribution for each traffic type to an equivalent traffic demand distribution, to generate a single distribution for reference traffic, wherein the single distribution is used to determine that the indicated traffic distribution is serviceable by the virtual service provider controller; and
    transmitting, by the virtual service provider controller, an admission decision to the virtual network operator.

2. The method of claim 1 wherein the indicated traffic distribution includes a geographical distribution of user population.

3. The method of claim 2 wherein the indicated traffic distribution includes a geographical distribution of service types used by the user population.

4. The method of claim 1, further comprising:
    transmitting, by the virtual service provider controller to the virtual network operator, a definition of the one or more regions to be used by the virtual network operator for indicating the geographic distribution of traffic.

5. The method of claim 4, wherein the definition of the one or more regions is based on signal strength from access points available to the virtual service provider controller.

6. The method of claim 1, further comprising:
    after transmitting the admission decision, transmitting, by the virtual service provider controller to the virtual network operator, additional information about a user population of the virtual network operator, the additional information including: performance statistics for the user population, resource usage by the user population, per user usage statistics, per application statistics, or location distribution for the user population.

7. The method of claim 1, further comprising:
after transmitting the admission decision, transmitting, by the virtual service provider controller to the virtual network operator, an indication of network status information.

8. The method of claim 1 wherein determining that the indicated traffic distribution is serviceable comprises:
aggregating the indicated traffic distribution with traffic distribution of one or more already admitted virtual networks to obtain an aggregated traffic distribution; and
determining that the aggregated traffic distribution is serviceable by the virtual service provider controller.

9. The method of claim 8, wherein the traffic distribution of at least one already admitted virtual network is obtained from a performance database containing simulated or historical data.

10. The method of claim 8, wherein the traffic distribution of at least one already admitted virtual network comprises expected resource requirement for the at least one of: the one or more regions, and the one or more time periods.

11. The method of claim 8, wherein the indicated traffic distribution is a first traffic distribution and the traffic distribution of one or more already admitted virtual networks includes a second traffic distribution, and wherein aggregating the first and second traffic distributions comprises:
weighting each of the first and second traffic distributions according to a respective weighting factor, and aggregating the weighted first and second traffic distributions.

12. The method of claim 11, wherein each weighting factor is related to a respective service type, and wherein each weighting factor is determined based on a per bit resource usage for each respective service type, for each of the one or more regions.

13. The method of claim 12, further comprising:
prior to receiving the request for admission, transmitting, by the virtual service provider controller to the virtual network operator, the respective weighting factors.

14. The method of claim 1, wherein determining that the indicated traffic distribution is serviceable comprises:
determining that the indicated traffic distribution is not serviceable by resources currently available to the virtual service provider controller;
transmitting, by the virtual service provider controller to an infrastructure provider network controller, a request for additional resources;
receiving, from the infrastructure provider network controller, a grant for additional resources; and
determining that the indicated traffic distribution is serviceable by the virtual service provider controller based on the granted additional resources.

15. The method of claim 14, wherein at least two of the virtual network operator, the virtual service provider controller and the infrastructure provider network controller are operated by a same vendor.

16. The method of claim 1, wherein determining that the indicated traffic distribution is serviceable comprises:
assessing that the resources currently available to the virtual service provider controller are sufficient to meet requested service requirements of the virtual network while meeting service requirements of one or more already admitted virtual networks.

17. The method of claim 16, wherein the assessing comprises assessing that the resources currently available to the virtual service provider controller are sufficient, based on historical traffic data.

18. The method of claim 1, wherein determining that the indicated traffic distribution is serviceable comprises:
determining that the indicated traffic distribution is not serviceable by resources currently available to the virtual service provider controller;
determining an adjustment to resources allocated to one or more already admitted virtual networks, to accommodate the indicated traffic distribution; and
determining that the indicated traffic distribution is serviceable by the virtual service provider controller after the adjustment.

19. The method of claim 1, wherein the request for admission includes a key performance index (KPI), and wherein determining that the indicated traffic distribution is serviceable comprises:
determining that the KPI can be met.

20. The method of claim 19, wherein the KPI includes: an acceptable blocking probability for a class of traffic or an acceptable drop probability.

21. The method of claim 1, wherein the request for admission includes an indication of one or more penalties to be applied when a requested service requirement is not met by the virtual service provider controller.

22. The method of claim 21, wherein the one or more penalties include at least one penalty associated with service for a class of traffic.

23. The method of claim 1, wherein the request for admission includes an indication of measurements to be provided to the virtual network operator, for determining a user fee.

24. The method of claim 1, wherein the request for admission includes indication of a monitoring mechanism to be used by the virtual service provider controller to monitor traffic.

25. The method of claim 1, further comprising:
transmitting, by the virtual service provider controller to the virtual network operator, an indication of a cost associated with provision of the virtual network by the virtual service provider controller.

26. A system comprising a virtual network operator and a virtual service provider controller having a processor and a memory managing admission of a virtual network, the virtual service provider controller configured to:
receive, from a virtual network operator, a request for admission of a virtual network, the request including an indicator of traffic distribution, the indicator including indication of at least one of geographic and temporal distribution of traffic, as defined for at least one of: one or more regions, and one or more time periods, wherein the indicated traffic distribution includes indication of traffic distribution for specific traffic types;
determine, based on the received request, that the indicated traffic distribution is not acceptable to be admitted by the virtual service provider controller, wherein determining that the indicated traffic distribution is not acceptable to be admitted comprises: mapping traffic density distribution for each traffic type to an equivalent traffic demand distribution, to generate a single distribution for reference traffic, wherein the single distribution is used to determine that the indicated traffic distribution is not acceptable to be admitted by the virtual service provider controller; and transmit a counter-offer to the virtual network operator, the counter-offer specifying one or more conditions different from the request for admission;

wherein the virtual network operator is configured to send the request and receive the counter-offer.

27. A virtual service provider controller comprising:

an interface for communicating with a virtual network operator; and a processor coupled to the interface, the processor configured to execute instructions to cause the virtual service provider controller to:

receive, via the interface, a request from the virtual network operator for admission of a virtual network, the request including an indicator of traffic distribution, the indicator including indication of at least one of geographic and temporal distribution of traffic, as defined for at least one of: one or more regions, and one or more time periods, wherein the indicated traffic distribution includes indication of traffic distribution for specific traffic types;

determine, based on the received request, whether the indicated traffic distribution is serviceable or acceptable to be admitted by the virtual service provider controller, wherein determining that the indicated traffic distribution is serviceable comprises mapping traffic density distribution for each traffic type to an equivalent traffic demand distribution, to generate a single distribution for reference traffic, wherein the single distribution is used to determine that the indicated traffic distribution is serviceable by the virtual service provider controller; and transmit, via the interface, either an admission decision or a counter-offer specifying one or more conditions different from the request for admission to the virtual network operator according to a result of the determination.

28. The method of claim 1, wherein the request further includes at least one of:

a key performance index (KPI) requirement;
a penalty associated with failure to meet the KPI requirement;
an indication of one or more user types;
a probability of usage of one or more service types;
a model of at least one of: traffic and user mobility;
session statistics;
a packet distribution of traffic source;
a quality of service (QoS) requirement for a traffic type;
statistical information about historical traffic distribution;
a geographical factor;
a temporal factor;
a user population factor;
a service type factor;
a peak rate factor;
a service outage rate factor;
a blocking rate factor;
a service quality factor; or
a coverage factor.

* * * * *